United States Patent [19]

Martin et al.

[11] Patent Number: 4,743,730
[45] Date of Patent: May 10, 1988

[54] DEVICE FOR STRAIGHTENING AND CUTTING METALLIC WIRE

[75] Inventors: Francois Martin; Roland Martin, both of Valleiry, France

[73] Assignee: Charmilles Technologies S.A., Geneva, Switzerland

[21] Appl. No.: 907,832

[22] Filed: Sep. 15, 1986

[30] Foreign Application Priority Data

Sep. 16, 1985 [CH] Switzerland ............... 4018/85

[51] Int. Cl.⁴ ............... B23H 7/10; B21F 1/02; B21F 11/00; C21D 9/62
[52] U.S. Cl. ............... 219/69 W; 140/139; 140/147; 219/155
[58] Field of Search ............... 219/69 W, 155, 69 M; 140/139, 147

[56] References Cited

U.S. PATENT DOCUMENTS

| | | | |
|---|---|---|---|
| 3,606,778 | 9/1971 | Bomberger | 219/155 |
| 3,912,899 | 10/1975 | Lehmann et al. | 219/69 W |
| 4,367,392 | 1/1983 | Girardin | 219/69 W |
| 4,379,959 | 4/1983 | Inoue | 219/69 M |
| 4,427,870 | 1/1984 | Inoue | 219/69 W |
| 4,547,647 | 10/1985 | Schneider | 219/69 W |

FOREIGN PATENT DOCUMENTS

| | | | |
|---|---|---|---|
| 58-132420 | 8/1983 | Japan . | |
| 58-132421 | 8/1983 | Japan . | |
| 107737 | 6/1984 | Japan | 219/69 W |
| 61-8225 | 1/1986 | Japan | 219/69 W |
| 2075897 | 11/1981 | United Kingdom | 140/139 |

Primary Examiner—A. D. Pellinen
Assistant Examiner—Geoffrey S. Evans
Attorney, Agent, or Firm—Gifford, Groh, VanOphem, Sheridan, Sprinkle and Dolgorukov

[57] ABSTRACT

A device installed on a traveling wire EDM apparatus for straightening the electrode wire and providing the electrode wire with a needle point end for facilitating manual threading of the electrode wire through close tolerance closed wire guide members. The device takes the form of a pair of spaced-apart current conductive metallic studs, a heat shield being located at some intermediate portion between the metallic studs. The metallic studs are connected across a source of electrical power. A length of wire proximate its end is held manually over the metallic studs, with an intermediate portion of the wire disposed within the heat shield, and a pull is manually exerted on the wire beyond the metallic studs while the wire is being heated by electrical current flow through the wire between the two metallic studs. The wire is heat-straightened and ruptures at its portion within the heat shield, with sharp needle point ends being formed at the point of rupture.

14 Claims, 2 Drawing Sheets

DEVICE FOR STRAIGHTENING AND CUTTING METALLIC WIRE

BACKGROUND OF THE INVENTION

The invention relates to a device for straightening and cutting a metallic wire in general, and more particularly, to a device for straightening and cutting the metallic wire used as an electrode wire in an EDM apparatus, prior to threading the wire through its support and guide members.

Electrode wires used in traveling wire EDM apparatus must be threaded through appropriate guide members. A preferred structure for electrode wire guide members is similar to drawdies. For example the electrode wire guide member is made of a sapphire or diamond provided with a cylindrical aperture. Such an electrode wire guide member is a closed guide member, in contrast to an open guide member, wherein the guide member is provided with a V-groove. A closed wire guide member presents the advantage of being axially symmetrical, which is an important feature when it is desired to incline the electrode wire in diverse angular directions in the course of effecting a cut in a workpiece.

In order to provide accurate cutting of a workpiece, the electrode wire has a diameter which is slightly smaller than the diameter of the aperture in the closed guide member. For example, if a diameter of 250 microns is chosen for the electrode wire, the closed guide member has an aperture of 252 microns in diameter. It is evident that under those conditions it is very difficult to thread the electrode wire through the guide member because of the friction between the peripheral surface of the wire and the surface of the aperture in the closed guide member and the tendency of the wire to buckle because of its lack of rigidity. Automatic threading mechanisms have been developed, such as described in application Ser. No. 879,818, assigned to the same assignee as the present application. Such mechanisms, however, require that the first threading operation be effected manually. The method for manually threading the wire usually consists in holding a length of wire between both hands, manually pulling on the wire while exposing it to a flame, for example the flame from a lighter or match, concentrated on a given section of the wire. Under the simultaneous effect of the pull being exerted on the wire and the heat of the flame applied to the wire, the wire elongates and takes a straight shape. Eventually, the wire breaks at the point of heat concentration corresponding to the point of maximum constriction, or decrease in diameter. The two ends of the wire at the point of rupture are provided with a sharp needle point which is useful in threading the wire through a closed guide member. One inconvenience associated with such a method is that it requires the learning of a particular skill on the part of the operator, because an appropriate pulling force must be exerted on the wire while progressively moving the wire towards the flame. An operator lacking the necessary skill is often forced to repeat this operation before he is able to achieve the desired result, namely to obtain a wire which has been straightened over a sufficient length, and which ends in a needle point. In addition, the operator cannot successfully hold both ends of the wire and the lighter or match.

SUMMARY OF THE INVENTION

The present invention provides a method and device for straightening an electrode wire and cutting it by forming a needle point at the end of the electrode wire prior to manually threading the electrode wire through a closed wire guide in a traveling wire EDM apparatus, without requiring particular skill on the part of the operator, and insuring that the wire has been adequately prepared for threading in a single operation. The principal object of the invention is to provide a simple and low cost fixture which can be mounted directly on the EDM apparatus, close to the electrode wire guide members.

The device has a pair of spaced-apart electrical conductive studs, and a heat shield disposed between the studs. The electrical conductive studs are connected across a source of electrical power. A length of wire is stretched between the studs and the length of wire is heated by the current delivered by the studs to the wire. The wire is straightened while being stretched and ruptures by constriction of the wire within the heat shield.

The many objects and advantages of the present invention will become immediately apparent to those skilled in the art when the following description of the best mode contemplated at the present for practicing the invention is read in conjunction with the accompanying drawing, wherein:

DETAILED DESCRIPTION OF THE PREFERRED EMBODIMENT

Figure 1:
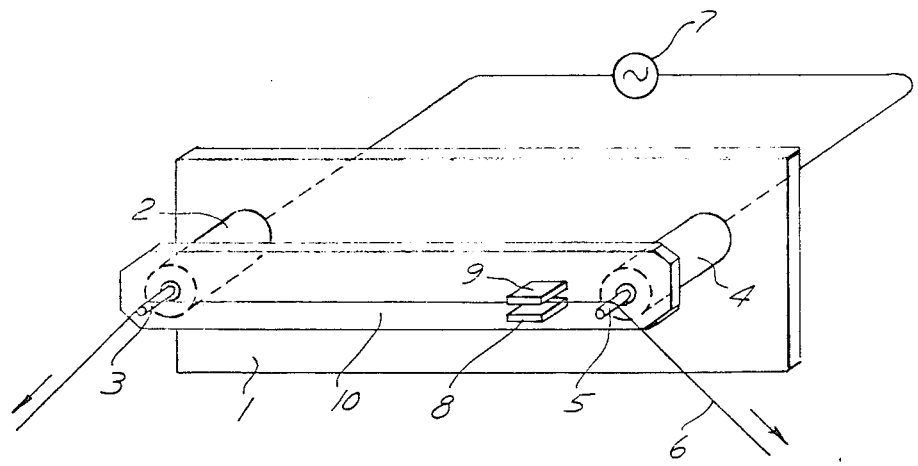
FIG. 1 schematically illustrates an example of a device structure for practicing the invention.

Referring to the drawing and more particularly to FIG. 1, there is illustrated a support plate 1, disposed vertically which may be a portion of a traveling wire EDM apparatus. An insulator 2 supports a metallic stud 3, and a spaced-apart second insulator 4 supports a second metallic stud 5, the metallic studs projecting from the end of the insulators and the insulators being mounted on the plate 1. The metallic studs 3 and 5 are connected across a source 7 of electrical current. Alternating current can be used for simplicity, but it is evident that direct current can also be used. The voltage is preferably a low voltage, for example around 10–12 volts, such as not to be dangerous for the machine operator but still allow resistance heating of a length of electrode wire 6 stretched between the metallic studs 3 and 5, to a temperature allowing plastic elongation of the wire by manually exerting a traction on the wire in the direction of the arrows. A pair of parallel small blades 8 and 9 preferably made of heat insulating material, are mounted on an elongated plate 10, made of dielectric material, extending from one metallic stud 3 to the other metallic stud 5. The small blades 8 and 9 are disposed one below and the other above a portion of the electrode wire 6 stretched between the metallic studs 3 and 5 and the small blades 8 and 9 act as local shields against the formation of convection air currents when the wire 6 is heated by the electrical current flowing through it.

It is known that convection air currents are small circular air currents that tend to ascend because of the reduced density of heated air. The heat shields formed by the small blades 8 and 9 limit the vertical air currents and therefore locally shield the wire against heat losses. Consequently, the electrode wire 6 has a localized higher temperature at its portion between the blades 8 and 9, and rupture of the wire by constriction occurs at such location between the blades, while providing the ends of the wire at the point of rupture each with a needle point. The metallic studs 3 and 5 are spaced apart to a predetermined distance which is wide enough to straighten the wire over a sufficient length. The distance between the metallic studs 3 and 5 may be chosen such as to be longer than the thickness of the electrode wire support and guide "heads" 28 and 29, FIG. 3, of the traveling wire EDM apparatus. The distance between the metallic rods 3 and 5 can also be chosen, if so desired, to be longer than the added thicknesses of the support and guide heads of the traveling wire EDM apparatus, plus the distance separating the heads, such as to allow manual threading of the end of the electrode wire through both the wire support and guide heads 28 and 29 in one attempt. It is evident that the length of the wire which is heat-straightened is much longer than the length of the wire brought to a higher temperature due to the heat convection shield formed by the blades 8 and 9. The length of the blades is substantially shorter than the distance separating the metallic studs 3 and 5, for example of the order of one-sixth of the distance separating the metallic studs. The blades 8 and 9 are located, for example, at one-fourth of the distance between the studs 3 and 5.

Figure 2:
FIG. 2 illustrates an alternate form of heat shield for locally reducing heat losses from the wire prior to its rupture.

It will be appreciated that although the principal effect of the blades 8 and 9 is that of locally reducing cooling of the wire 6 by convection, the heat shield formed by the blades can also reflect back to the wire a portion of the thermal radiation emitted by the wire, if so desired. For that purpose, a metallic or metal-coated shield is used, while a transparent shield is used if it is desired to visually observe the zone of rupture of the wire. The present invention is in no way limited to a shield consisting of two blades. Said shield can present any appropriate form. It may consist, for example, of a tubular member 11, FIG. 2, mounted on the plate 10 of the device fixture of FIG. 1, which is preferably provided with a longitudinal slit 12 in order to facilitate introduction of the wire 6 through the tubular member 11.

Figure 3:
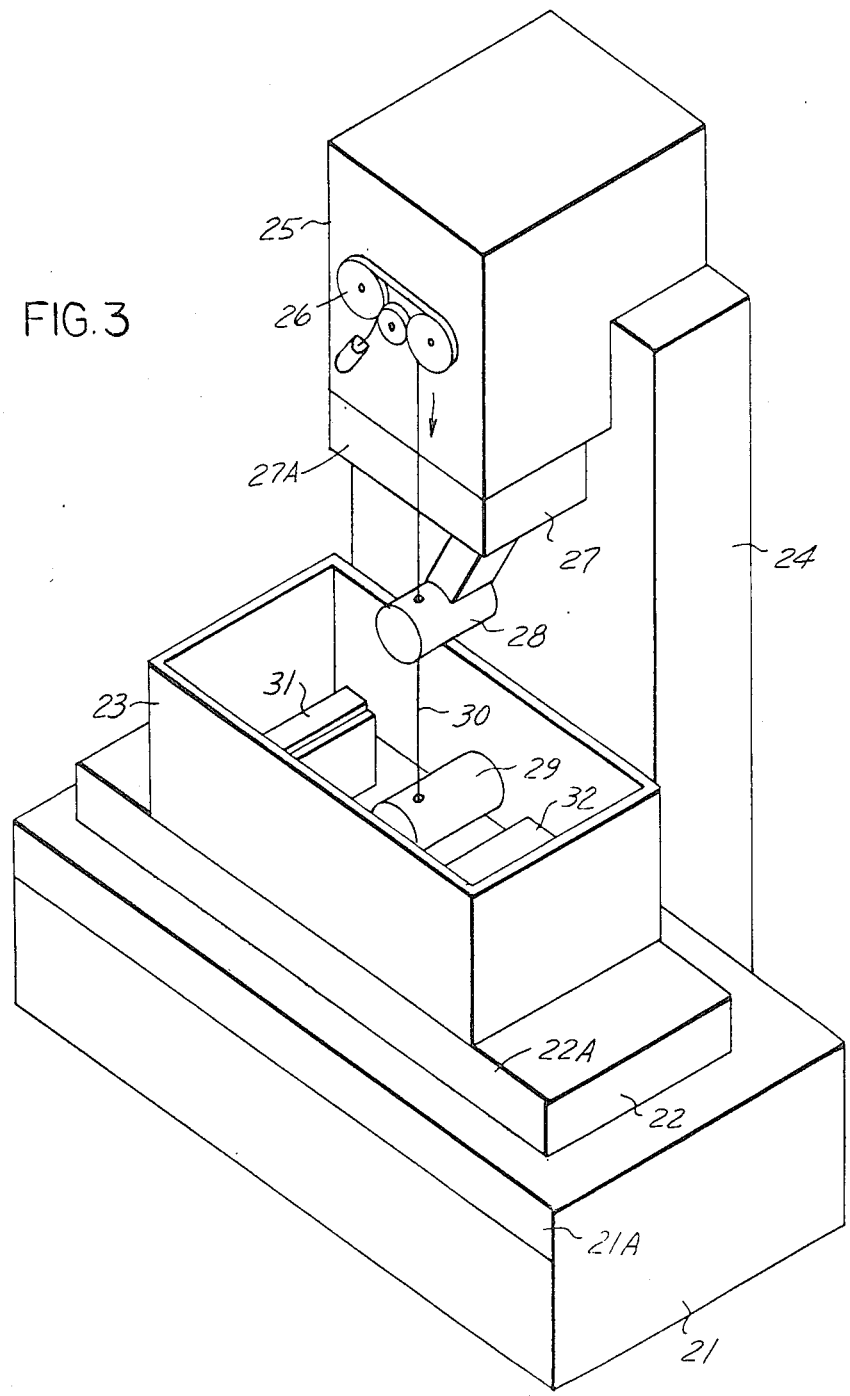
FIG. 3 illustrates, schematically, a traveling wire EDM apparatus and preferred locations for installing the device of the invention.

FIG. 3 is a schematic perspective representation of a traveling wire EDM apparatus. The apparatus comprises a base 21 supporting a cross-slide table 22 on the top of which is mounted a tank 23 in which are disposed a pair of supports 31 and 32 for a workpiece, not shown. An upright member 24 supports on its top a block 25 on which is mounted an electrode wire supply, not shown, and a wire feed braking mechanism 26. A cross-slide table 27 mounted below the block 25 supports the electrode wire upper support and guide head 28, the lower wire support and guide head 29 being disposed in the tank 23. The cross-slide table 27, on the bottom of which the upper support and guide head 28 is mounted, permits the latter to be displaced along two crossed axes to incline the electrode wire 30, which is continuously displaced longitudinally between the upper and the lower support and guide heads, to effectuate a cut at an angle in the workpiece, not shown, if so desired. Within each of the support and guide heads 28 and 29, the electrode wire passes through a closed guide member having an aperture hardly wider than the diameter of the wire, as previously mentioned. An appropriate wire feed mechanism, not shown, such as pinch rollers or a twin-belt conveyor disposed below the lower wire support and guide head 29, exerts a pull on the wire 30 such as to feed the wire axially in the direction of the arrow, such as to continuously renew the electrode wire in the machining zone between the wire and the workpiece in the course of a cut being effected in the workpiece.

Any time the electrode wire needs to be manually threaded, either because of accidental rupture, or for any other reason, the fixture for straightening and cutting off the wire, FIG. 1, may be used. The fixture is attached to the EDM apparatus, FIG. 3, preferably within easy access of the machine operator. For that purpose, the fixture is mounted on, for example, one of the surfaces designated 21A, 22A and 27A. As such surfaces are vertical and have a considerable horizontal length, the insulated conductive metallic studs 3 and 5, FIG. 1, may be located substantially at the same height, such as to provide a relatively good cooling of the wire by convection, except at its portion protected by the heat shield defined by the blades 8 and 9, FIG. 1, or by the tubular member 11, FIG. 2. The electrical current required for resistance heating of the wire may easily be obtained from the EDM apparatus power supply and, in view of the low voltage used, the metallic studs may constantly be connected across their power supply after the power supply of the EDM apparatus has been turned on, which permits to omit connecting a switch in the wire heating circuit.

Figure 4:
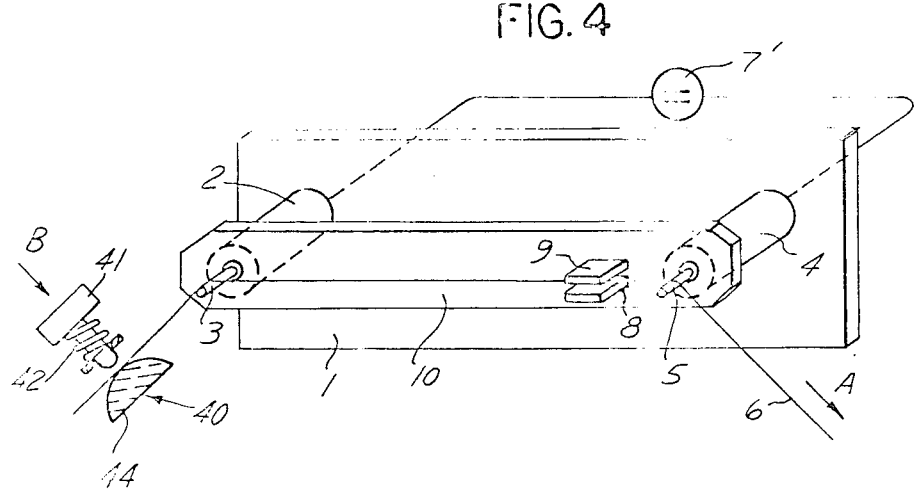
FIG. 4 illustrates a variant of the embodiment of FIG. 1.

FIG. 4 represents an embodiment which entirely avoids the application of any electrical current, however small, to the hands of the operator. In this figure, parts which are analogous to those of FIG. 1, carry the same reference numerals. The source 7' has a floating potential, i.e. it is not grounded, and, in addition to the elements shown in FIG. 1, the device of FIG. 4 comprises a clamp 40 placed on the lefthand side of stud 3. This clamp, which is represented schematically in the drawing, a knob 41 made of an insulating material to which is fixed a bolt 43 directed towards an anvil 44, which is also electrically insulating. The knob and the bolt are slidable in the axial direction of the latter, and a return spring 42 maintains a free end of the bolt at a small distance from the anvil 44. If the operator engages the wire between the bolt and anvil and exerts a sufficient pressure on the knobs 41 with one hand in the direction of the arrow B, the wire will be clamped at the left of studs 3 and 5. The operator can then exert with his other hand in the direction of arrow A a traction which results in severing the wire, without contacting electrical current with his hands.

Having thus described the present invention by way of an example of structure well-designed for accomplishing the objects of the invention, modifications whereof will be apparent to those skilled in the art, what is claimed as new is as follows:

We claim:

1. A device for straightening and forming a needle like point on a conductive metallic wire, said device comprising; a pair of spaced-apart electrical conductive members connected across a source of electrical current, said pair of conductive members supporting a section of said conductive wire stretched between said pair of conductive members, said pair of conductive members electrically contacting said conductive metallic wire to apply an electrical current to said conductive wire for resistance heating of said conductive wire; and a heat shield disposed at a predetermined location intermediary between said pair of conductive members, said heat shield surrounding at least partially in radial direction a portion of said segment of said conductive wire joining said pair of conductive members, said heat shield having a length substantially less than said segment of electrode wire whereby the amount of heat lost within said portion through convection and radiation by said segment of said conductive wire stretched between said pair of conductive members and heated by the current delivered by said source is reduced causing thus a rupture by constriction of said portion of said wire within said shield and forming said needle-like point on each end of said portion of wire ruptured and heat straightening said segment of conductive wire between said conductive members.

2. The device of claim 1 wherein said predetermined location of said heat shield is disposed within a distance being one quarter of the length of said segment of wire, and extending from one of said pair of conductive members.

3. The device of claim 1 wherein each of said pair of conductive members is a metallic stud mounted on a substantially vertical surface of an EDM apparatus, and said conductive wire is an electrode wire of said EDM apparatus.

4. The device of claim 3 wherein each of said studs is continuously connected across said electrical current source when said EDM apparatus is activated.

5. The device of claim 1 wherein said pair of conductive members are mounted along a substantially horizontal plane.

6. The device of claim 5 wherein said heat shield comprises a pair of substantially parallel and horizontal spaced apart blades disposed one above and the other below said segment of conductive wire joining said pair of conductive members.

7. The device of claim 1 wherein said heat shield is a tubular member.

8. The device of claim 7 wherein said tubular member has a longitudinal slit for introduction therethrough of said conductive wire.

9. The device of claim 1 wherein said heat shield is transparent.

10. The device of claim 1 wherein said pair of current conductive members are constantly connected across said source of electrical current.

11. The device of claim 1 wherein the potential of said electrical current source is floating.

12. The device of claim 1 further comprising a manually operable clamp adapted for gripping and immobilizing the wire, said clamp having a gripping part being electrically insulated from a portion of said clamp which is manipulated by the operator.

13. The device of claim 1 wherein said heat shield is mounted on an electrically insulated plate extending between said pair of conductive members.

14. The device of claim 6 wherein each of said pair of blades further comprises a length which is less than one sixth the length of said segment of conductive wire.

* * * * *